US011550490B2

(12) United States Patent
Chen et al.

(10) Patent No.: US 11,550,490 B2
(45) Date of Patent: Jan. 10, 2023

(54) SCALABLE STORAGE CLUSTER MIRRORING

(71) Applicant: Red Hat, Inc., Raleigh, NC (US)

(72) Inventors: Huamin Chen, Westford, MA (US); Kefu Chai, Shanghai (CN)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 16/788,720

(22) Filed: Feb. 12, 2020

(65) Prior Publication Data

US 2021/0247905 A1 Aug. 12, 2021

(51) Int. Cl.
*G06F 3/06* (2006.01)

(52) U.S. Cl.
CPC ............. *G06F 3/065* (2013.01); *G06F 3/067* (2013.01); *G06F 3/0619* (2013.01); *G06F 3/0622* (2013.01)

(58) Field of Classification Search
CPC ...... G06F 3/065; G06F 3/0619; G06F 3/0622; G06F 3/067
See application file for complete search history.

(56) References Cited

U.S. PATENT DOCUMENTS

| | | | | |
|---|---|---|---|---|
| 2002/0191311 A1* | 12/2002 | Ulrich | ............ | G06F 16/10 360/1 |
| 2012/0030306 A1* | 2/2012 | Kami | ............ | G06F 9/5077 709/213 |
| 2012/0221710 A1* | 8/2012 | Tsirkin | ............ | G06F 9/4856 709/224 |
| 2014/0013051 A1* | 1/2014 | Qian | ............ | G06F 12/0246 711/115 |
| 2014/0208329 A1* | 7/2014 | Abali | ............ | G06F 9/45533 718/104 |
| 2014/0282522 A1* | 9/2014 | Daly | ............ | G06F 9/45558 718/1 |
| 2016/0077925 A1* | 3/2016 | Tekade | ............ | G06F 3/065 707/654 |
| 2018/0024854 A1* | 1/2018 | Wang | ............ | G06F 9/5088 718/1 |
| 2019/0065227 A1* | 2/2019 | Tsirkin | ............ | G06F 9/45558 |

(Continued)

OTHER PUBLICATIONS

Author Unknown, "Quarkus—Writing Your Own Extension," retrieved Nov. 28, 2019 from https://quarkus.io/guides/writing-extensions, 48 pages.

(Continued)

*Primary Examiner* — Arpan P. Savla
*Assistant Examiner* — Eric T Loonan
(74) *Attorney, Agent, or Firm* — Dority & Manning, P.A.

(57) ABSTRACT

Scalable storage cluster mirroring is disclosed. A compute instance comprising a processor device determines that storage segments have been modified on a first storage node of a plurality of storage nodes in a first cluster of storage nodes at a first data modification rate. In response to determining that the storage segments have been modified on the first storage node at the first data modification rate, a first mirror process that is configured to copy storage segments from an identified storage node to a mirrored cluster of storage nodes is initiated, and a storage node identifier that identifies the first storage node is communicated to the first mirror process.

20 Claims, 14 Drawing Sheets

(56) References Cited

U.S. PATENT DOCUMENTS

2019/0265995 A1* 8/2019 Franciosi ............ G06F 9/45558

OTHER PUBLICATIONS

Baeldung, "CDI Portable Extension and Flyway," Nov. 6, 2018, available at https://www.baeldung.com/cdi-portable-extension, 8 pages.
Author Unknown, "How to serialize an injected bean?" Aug. 22, 2017, retrieved Nov. 28, 2019 from https://stackoverflow.com/questions/45828159/how-to-serialize-an-injected-bean, 5 pages.

* cited by examiner

SCALABLE STORAGE CLUSTER MIRRORING

BACKGROUND

A storage cluster is made up of a number of storage nodes on which data is stored. A storage node is an electronic device that may unexpectedly fail, or lose power. In the event of a power failure, to ensure that services that rely on the data are not disrupted for a long period of time, it may be desirable to mirror (i.e., copy) the data in one storage cluster to another storage cluster, often substantially in real-time, so that each storage cluster contains an identical copy of the data. Mirroring data from one cluster to another may also be utilized for purposes of data migration.

SUMMARY

The examples disclosed herein implement scalable storage cluster mirroring. The examples utilize tunable, on-demand and scalable mirror processes that are initiated, or terminated, as needed, based on a real-time data modification rate that is occurring on the storage nodes of a storage cluster and a real-time data mirror rate of the mirror processes.

In one example a method is provided. The method includes determining, by a compute instance comprising a processor device, that storage segments have been modified on a first storage node of a plurality of storage nodes in a first cluster of storage nodes at a first data modification rate. The method further includes, in response to determining that the storage segments have been modified on the first storage node at the first data modification rate, initiating a first mirror process that is configured to copy storage segments from an identified storage node to a mirrored cluster of storage nodes. The method further includes communicating, to the first mirror process, a storage node identifier that identifies the first storage node.

In another example a compute instance is provided. The compute instance includes a memory and a processor device coupled to the memory. The processor device is to determine that storage segments have been modified on a first storage node of a plurality of storage nodes in a first cluster of storage nodes at a first data modification rate. The processor device is further to, in response to determining that the storage segments have been modified on the first storage node at the first data modification rate, initiate a first mirror process that is configured to copy storage segments from an identified storage node to a mirrored cluster of storage nodes. The processor device is further to communicate, to the first mirror process, a storage node identifier that identifies the first storage node.

In another example a computer program product is provided. The computer program product is stored on a non-transitory computer-readable storage medium and includes instructions to cause a processor device to determine that storage segments have been modified on a first storage node of a plurality of storage nodes in a first cluster of storage nodes at a first data modification rate. The instructions further cause the processor device to, in response to determining that the storage segments have been modified on the first storage node at the first data modification rate, initiate a first mirror process that is configured to copy storage segments from an identified storage node to a mirrored cluster of storage nodes. The instructions further cause the processor device to communicate, to the first mirror process, a storage node identifier that identifies the first storage node.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
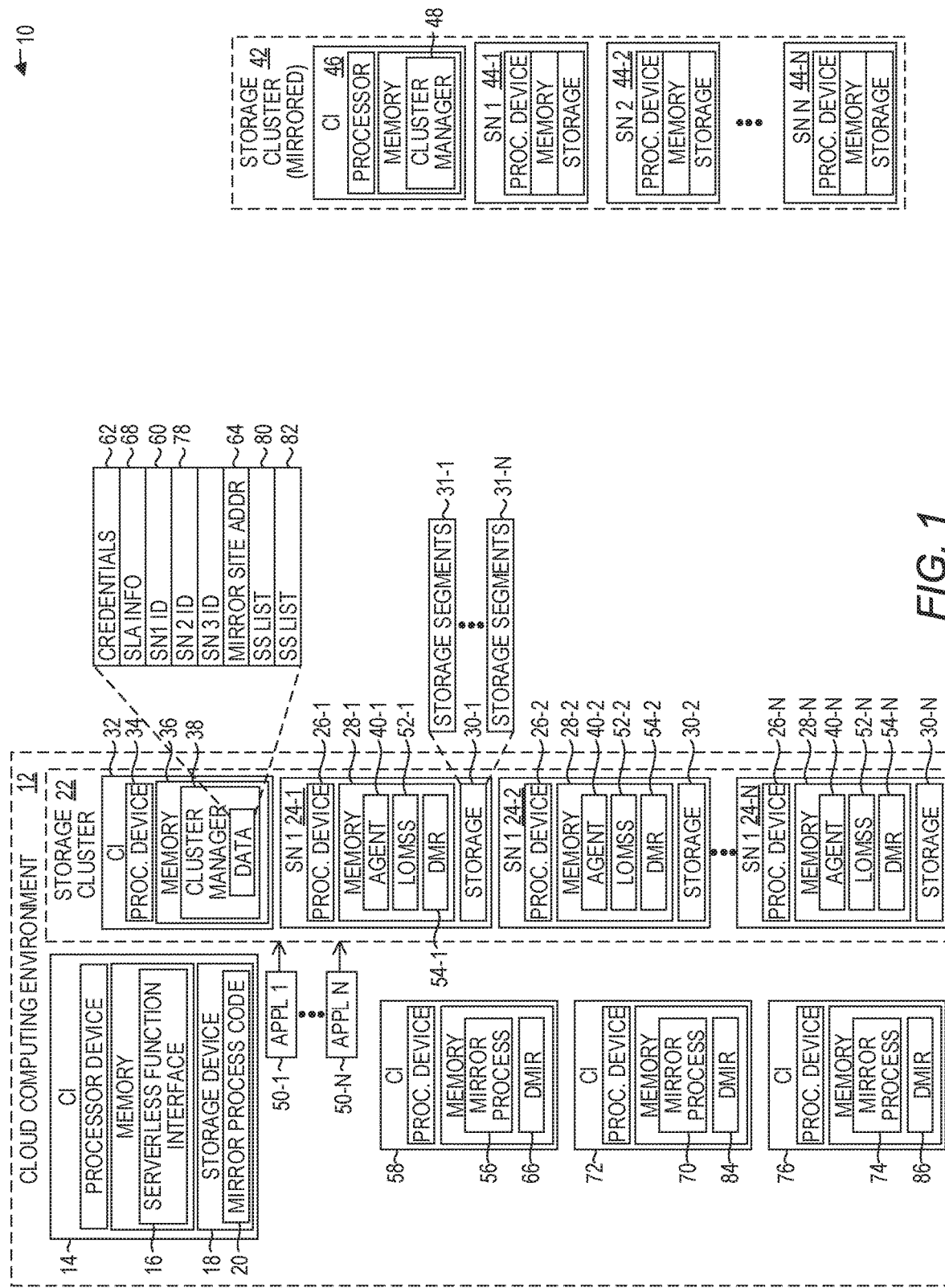
FIG. 1 is a block diagram of an environment in which examples can be practiced.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

A storage cluster is made up of a number of storage nodes on which data is stored. A storage node is an electronic device which may unexpectedly fail. To ensure that the data on a failed storage node is not lost, and to ensure that services that rely on the data are not disrupted for a long period of time, it may be desirable to mirror (i.e., copy) the data in one storage cluster to another storage cluster, often substantially in real-time, so that each storage cluster contains an identical copy of the data.

Typically, the mirroring process, sometimes referred to as a form of replication, involves two storage clusters, each of which is made up of a number of storage nodes. In a one-way mirroring environment, as data is modified on an original storage cluster, the data is copied to a mirrored storage cluster. As used herein, the term "modified" in the context of storage refers to any modification of data, including newly stored data, changed data, or deleted data. Typically a finite number of mirror tasks are initiated that await notification of modifications to the original storage cluster, and when notified, copy any modified storage segments from the original storage cluster to the mirrored storage cluster. The term "storage segment" as used herein refers to any uniquely identified unit of storage. Depending on the particular storage system at issue, a storage segment may be a fixed size, such as, by way of non-limiting example, 64 megabytes (MB), or may be a variable size. A storage segment may be, for example, an object in an object-based storage system, or a predetermined fixed-size portion of an object. A storage segment may be, for example, a file in a file-based storage system, or a predetermined fixed-size portion of a file.

There may be long periods of time, such as outside of normal work hours, during which there are few or no data modifications made to the storage cluster. Yet, the mirror tasks continue to utilize scarce resources, such as memory and CPU resources, even when not actively copying storage segments. Moreover, during high-activity periods of time when storage segments may be modified at an unexpectedly high rate, the mirror tasks may not be able to copy the data to the mirror site at the desired rate, which may lead to data vulnerabilities should a storage node unexpectedly fail, or may fail to meet a service level agreement requiring that data be mirrored at some guaranteed rate.

Enterprises, such as businesses, are increasingly utilizing cloud computing environments to implement desired data processing services. A cloud computing environment provider often charges fees based on the amount of resources being utilized. Mirror tasks that are utilizing memory and CPU resources during periods of time when little or no data modifications are being made to a storage cluster incur costs for no benefit.

The examples disclosed herein implement scalable storage cluster mirroring. The examples utilize tunable, on-demand and scalable mirror processes that are initiated, or terminated, as needed, based on a real-time data modification rate that is occurring on the storage nodes of a storage cluster and a real-time data mirror rate of the mirror processes. For example, if a data modification rate is exceeding the data mirror rate, additional mirror processes may be initiated. If the data mirror rate is exceeding the data modification rate, some mirror processes may be terminated. If no data modifications are occurring, all mirror processes may be terminated. In some examples, the number of mirror processes may also be influenced by a guaranteed data mirror rate associated with an enterprise and set forth, for example, in a service level agreement between a cloud computing environment provider and the enterprise. Among other advantages, the examples disclosed herein facilitate finer grained resource usage, such as, by way of non-limiting example, updating the throttling limit of data transmission.

FIG. 1 is a block diagram of an environment 10 in which examples can be practiced. The environment 10 includes a cloud computing environment 12. The phrase "cloud computing environment" as used herein refers to a computing environment, often provided by a cloud computing environment provider, which facilitates dynamic and scalable computing resources upon request. The examples have applicability in any public, private, and/or hybrid cloud computing environment, including, by way of non-limiting example, cloud computing environments implemented by Red Hat® OpenStack, Oracle® Cloud, Amazon® Web Services, Google® Cloud, Microsoft® Azure, IBM® cloud services, Salesforce.com®, and the like. It should be noted that while for purposes of illustration the examples are disclosed in the context of a cloud computing environment, the examples disclosed herein are not limited to a cloud computing environment and have applicability to any environment in which a storage cluster is mirrored.

The cloud computing environment 12 implements processing nodes referred to herein as compute instances (CI). A compute instance, as discussed herein, refers to a discrete runtime environment, and may comprise a physical (sometimes referred to as bare metal) computing device configured to run an operating system, or may comprise a virtual machine that emulates a physical machine. A virtual machine typically runs a guest operating system in conjunction with a virtual machine monitor, such as a hypervisor, that is configured to coordinate access to physical resources of a physical computing device, such as a memory and a processor device, by the virtual machines running on the physical computing device. A compute instance thus, whether a physical computing device or a virtual machine, includes a memory and a processor device.

A compute instance 14 of the cloud computing environment 12 includes a serverless function interface 16 that can be called or otherwise invoked to initiate a serverless function. As used herein, the term "serverless function" refers to computing processes that can be initiated by the cloud computing environment 12 upon request or upon the occurrence of certain criteria, that have no state, and that can be scaled up or down upon demand. The implementation of a serverless function may differ among different cloud computing environments; however, as an example, in an Amazon Web Services (AWS) cloud computing environment, serverless functions are implemented via the AWS Lambda serverless computing platform. In this example, the compute instance 14 includes, or is communicatively coupled to, a storage device 18 on which a mirror process code 20 is stored. The mirror process code 20 comprises executable instructions that implement the functionality of a mirror process, as discussed in greater detail below.

The cloud computing environment 12 includes a storage cluster 22 (hereinafter "cluster 22") that in turn includes a plurality of storage nodes 24-1-24-N. The storage nodes 24-1-24-N include processor devices 26-1-26-N and memories 28-1-28-N, respectively. The storage nodes 24-1-24-N also include storage devices 30-1-30-N, respectively. The storage device 30-1 comprises a plurality of storage segments 31-1-31-N. The storage devices 30-2-30-N similarly comprise a plurality of storage segments (not illustrated).

The cluster 22 includes a compute instance 32, which in turn includes a processor device 34 and a memory 36. A cluster manager 38 executes in the memory 36. Among other tasks, the cluster manager 38 communicates with agents 40-1-40-N which execute on the storage nodes 24-1-24-N, respectively. The environment 10 includes a storage cluster 42, which includes a plurality of storage nodes 44-1-44-N, and to which the storage segments on the storage devices 30-1-30-N are mirrored, as discussed in greater detail below. The storage cluster 42 also includes a compute instance 46 on which a cluster manager 48 executes.

A plurality of applications 50-1-50-N (generally, applications 50) executing in the cloud computing environment 12 store data on the cluster 22. It is noted that the compute instances on which the applications 50-1-50-N execute have been omitted due to space considerations. As the applications 50 modify storage segments of the storage nodes 24-1-24-N, each agent 40-1-40-N maintains a list of modified storage segments (LOMSS) 52-1-52-N, respectively, that identify the particular storage segments that have been modified, and thus that need to be mirrored to the storage cluster 42. As the applications 50 modify storage segments of the storage nodes 24-1-24-N, each agent 40-1-40-N also determines a data modification rate (DMR) 54-1-54-N that identifies a rate at which the storage segments on the respective storage nodes 24-1-24-N are being modified. The data modification rate 54 may be in any desirable units over any desirable increment of time. As an example, in a system wherein storage segments are a fixed size, the data modification rate 54 may comprise the number of storage segments modified over some interval, such as 100 milliseconds, 1 second, 5 seconds, or the like. In a system wherein storage segments are variable size, the data modification rate 54 may comprise the number of bytes of data modified over some interval, such as 100 milliseconds, 1 second, 5 seconds, or the like.

For purposes of illustration, assume that the applications 50-1-50-N make modifications to the storage nodes 24 over a period of time. The agent 40-1 determines the data modification rate 54-1 that identifies the rate at which storage segments 31 are being modified on the storage node 24-1, and sends the data modification rate 54-1 to the cluster manager 38. Based on the data modification rate 54-1, the cluster manager 38 invokes the serverless function interface 16 and thereby causes the initiation of a mirror process 56 on a compute instance 58. The cluster manager 38 communicates information to the mirror process 56, including, by way of non-limiting example, a storage node identifier 60 that identifies the storage node 24-1, authentication credentials 62 that are required by the storage node 24-1 to gain access to the storage segments 31, and an address 64 of the storage cluster 42 to which the modified storage segments 31 are to be copied. In some implementations, the cluster manager 38 may request, from the storage node 24-1, the list of modified storage segments 52-1, and communicate the list of modified storage segments 52-1 to the mirror process 56. In other implementations, after authenticating with the storage node 24-1, the mirror process 56 may obtain the list of modified storage segments 52-1 from the storage node 24-1. The communications between the cluster manager 38 and the mirror process 56 may take any desired form or forms, such as via parameters, the use of an application programming interface, the use of global environment variables, or any other mechanism by which the serverless function interface 16 facilitates communications between a serverless function and another process.

The mirror process 56 uses the authentication credentials 62 to authenticate with the storage node 24-1. The mirror process 56 may also obtain, from the storage node 24-1, the list of modified storage segments 52-1. The mirror process 56 begins obtaining copies of the modified storage segments 31 and sending the modified storage segments 31 to the storage cluster 42 utilizing the address 64. The mirror process 56 maintains a data mirror rate (DMIR) 66 that identifies a real-time rate at which the mirror process 56 sends the modified storage segments 31 to the storage cluster 42. The mirror process 56 sends the data mirror rate 66 to the cluster manager 38.

The cluster manager 38 receives the data modification rate 54-1 iteratively from the agent 40-1, and receives the data mirror rate 66 iteratively from the mirror process 56. Based on the data modification rate 54-1 and the data mirror rate 66, the cluster manager 38 determines whether the mirror process 56 is copying the modified storage segments 31 to the storage cluster 42 at a faster rate than the storage segments 31 are being modified on the storage node 24-1, is copying the modified storage segments 31 to the cluster 42 at a slower rate than the storage segments 31 are being modified on the storage node 24-1, or is copying the modified storage segments 31 to the cluster 42 at a rate substantially equivalent to the rate at which the storage segments 31 are being modified on the storage node 24-1.

In some implementations, the cluster manager 38 may access service level agreement (SLA) information 68, which may identify a guaranteed data mirror rate for the enterprise (i.e., tenant), associated with the storage segments 31. For example, the SLA information 68 may require that every modified storage segment 31 associated with this tenant be copied to the storage cluster 42 within 2 minutes of such modification. Based on the data modification rate 54-1 and the data mirror rate 66, the cluster manager 38 can determine whether the mirror process 56 is meeting the guaranteed data mirror rate.

The mirror process 56 may continuously be provided additional storage segment identifiers that identify storage segments 31 that are modified. In some implementations, the cluster manager 38 may periodically request the list of modified storage segments 52-1, identify newly modified storage segments 31 that were not previously identified to the mirror process 56, and communicate information to the mirror process 56 that identifies the newly modified storage segments. In another implementation, the mirror process 56 may iteratively communicate with the agent 40-1 to obtain information that identifies newly modified storage segments 31.

The agent 40-2 determines a data modification rate 54-2 that identifies the rate at which storage segments are being modified on the storage node 24-2, and sends the data modification rate 54-2 to the cluster manager 38. For purposes of illustration, assume that the data modification rate 54-2 is a greater rate than the data modification rate 54-1. Based on the data modification rate 54-2 and the SLA information 68, the cluster manager 38 determines that two mirror processes should be initiated, and invokes the serverless function interface 16 to cause the initiation of a mirror process 70 on a compute instance 72, and the initiation of a mirror process 74 on a compute instance 76. The cluster manager 38 communicates information to the mirror processes 70, 74 including, by way of non-limiting example, a storage node identifier 78 that identifies the storage node 24-2, authentication credentials 62 that are required by the storage node 24-2 to gain access to the storage segments of the storage node 24-2, and an address 64 of the storage cluster 42 to which the modified storage segments are to be copied.

The cluster manager 38 requests, from the storage node 24-2, the list of modified storage segments 52-2. The cluster manager 38 selects a first subset of storage segments identified on the list of modified storage segments 52-2 and populates a list 80 with the first subset of storage segments. The cluster manager 38 selects a second subset of storage segments identified on the list of modified storage segments 52-2 and populates a list 82 with the second subset of storage segments. Each of the storage segments identified on the list of modified storage segments 52-2 is identified in either the list 80 or the list 82. The cluster manager 38 communicates the list 80 to the mirror process 70 and communicates the list 82 to the mirror process 74.

The mirror process 70 authenticates with the storage node 24-2 using the authentication credentials 62, and begins copying the storage segments identified on the list 80 to the storage cluster 42. Similarly, the mirror process 74 authenticates with the storage node 24-2 using the authentication credentials 62, and begins copying the storage segments identified on the list 82 to the storage cluster 42.

The mirror process 70 periodically generates a data mirror rate 84 that identifies a real-time rate at which the mirror process 70 sends the modified storage segments of the storage node 24-2 to the storage cluster 42. The mirror process 74 also periodically generates a data mirror rate 86 that identifies a real-time rate at which the mirror process 74 sends the modified storage segments of the storage node 24-2 to the storage cluster 42 of storage nodes. The agent 40-2 periodically generates the data modification rate 54-2 that identifies the rate at which the storage segments on the storage node 24-2 are being modified, and sends the data modification rates 54-2 to the cluster manager 38.

The cluster manager 38 receives the data mirror rates 84, the data mirror rates 86, and the data modification rates 54-2. The cluster manager 38 determines that the rate at which the modified storage segments are being copied to the storage cluster 42 given the rate at which storage segments are being modified meets the guaranteed data mirror rate identified in the SLA information 68 and thus, that an additional mirror process need not be initiated.

At some point in time, the data modification rate 54-2 indicates that storage segments are being modified on the storage node 24-2 at a very slow rate. This could occur, for example, after normal work hours. The cluster manager 38 determines that, given the data modification rate 54-2, a single mirror process can copy modified storage segments on the storage node 24-2 at a data mirror rate sufficient to meet the guaranteed data mirror rate identified in the SLA information 68. The cluster manager 38 terminates the mirror process 74, thus freeing up scarce memory and CPU resources that are otherwise used by the mirror process 74, and eliminating any costs that would otherwise be incurred by the mirror process 74.

It is noted that, because each of the cluster manager 38, the agent 40-1, and the mirror process 56 are components of the respective computing device on which they are executing, functionality implemented by any of the cluster manager 38, the agent 40-1, and the mirror process 56 may be attributed to the respective computing device on which they are executing. Moreover, in examples where the cluster manager 38, the agent 40-1, and the mirror process 56 comprise software instructions that program a processor device to carry out functionality discussed herein, functionality implemented by the cluster manager 38, the agent 40-1, and the mirror process 56 may be attributed herein to the respective processor device of the computing device on which they are executing.

It is also noted that, for simplicity and clarity, networks and communication paths have been omitted from FIG. 1; however, it will be understood that each of the components are communicatively coupled to one another via one or more networks.

Figure 2:
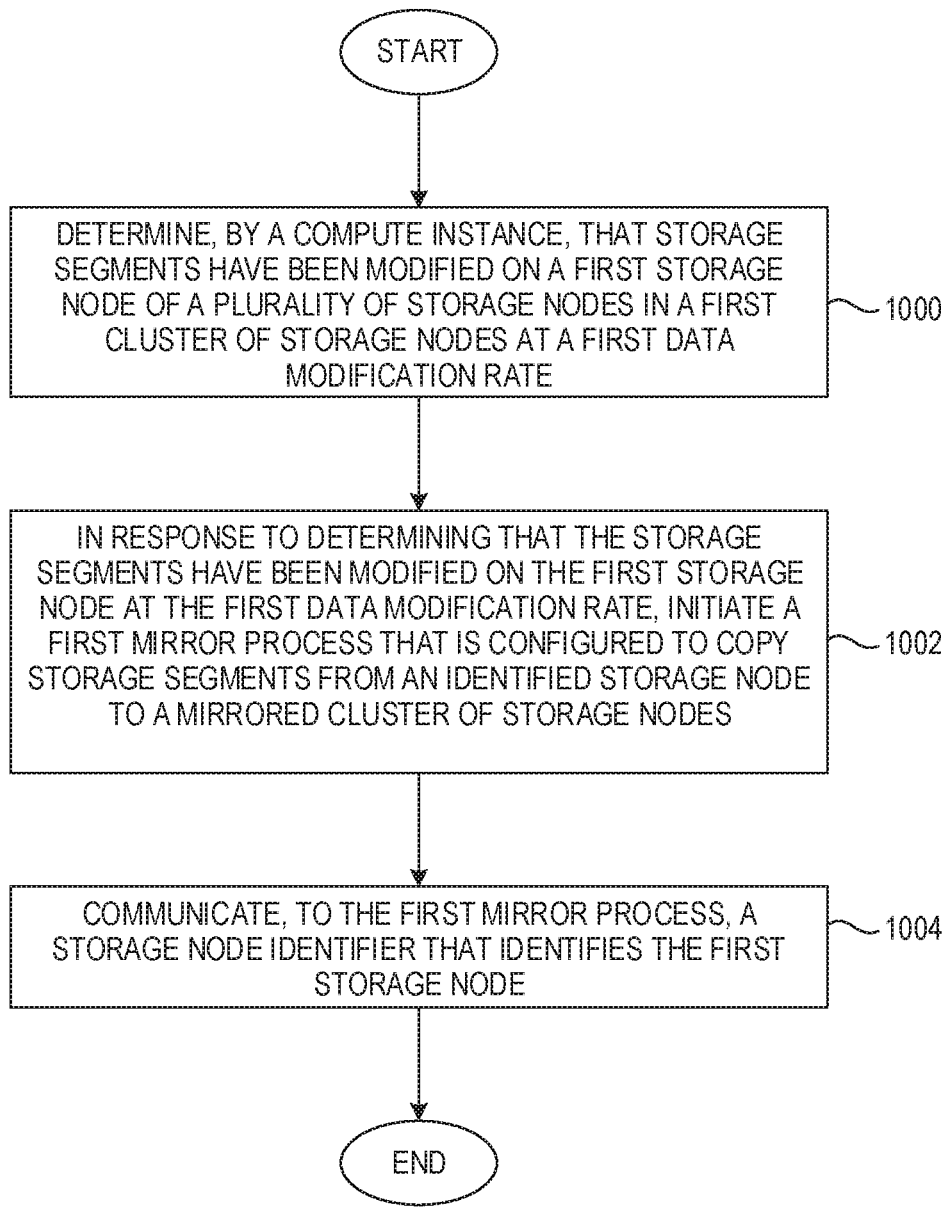
FIG. 2 is a flowchart of a method for scalable storage cluster mirroring from the perspective of a cluster manager according to one implementation.

FIG. 2 is a flowchart of a method for scalable storage cluster mirroring from the perspective of the cluster manager 38 according to one implementation. FIG. 2 will be discussed in conjunction with FIG. 1. The compute instance 32 determines that the storage segments 31 have been modified on the storage node 24-1 of the plurality of storage nodes 24-1-24-N in the cluster 22 of the storage nodes 24-1-24-N at the data modification rate 54-1 (FIG. 2, block 1000). In response to determining that the storage segments 31 have been modified on the storage node 24-1 at the data modification rate 54-1, the compute instance 32 initiates the mirror process 56 that is configured to copy storage segments from an identified storage node to a mirrored cluster of storage nodes (FIG. 2, block 1002). The compute instance 32 communicates, to the mirror process 56, the storage node identifier 60 that identifies the storage node 24-1 (FIG. 2, block 1004).

Figure 3:
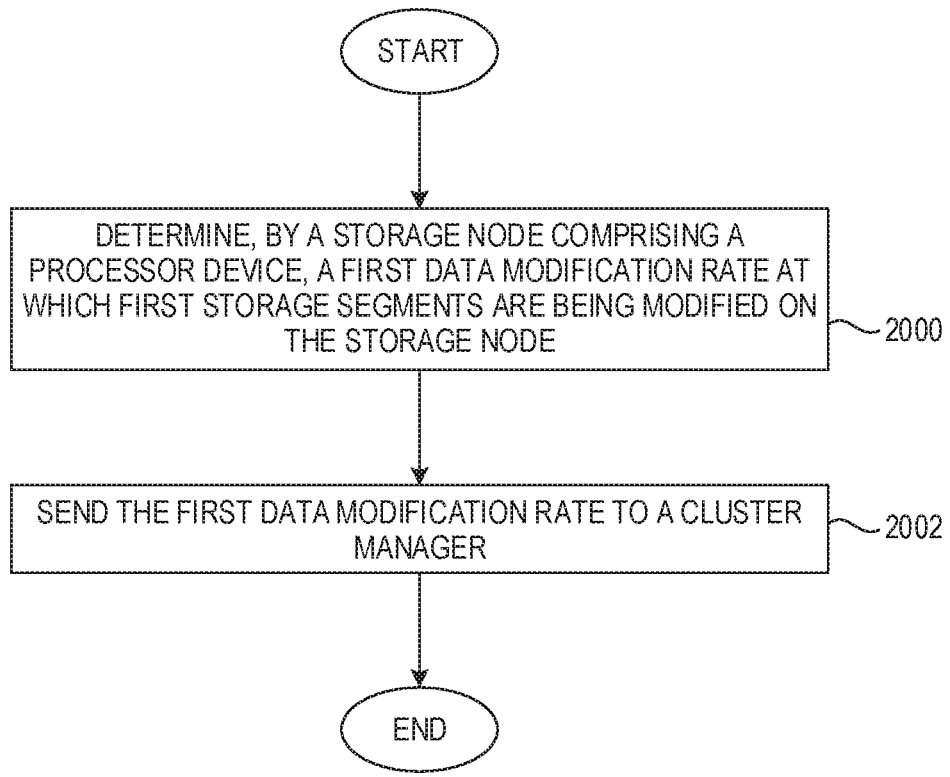
FIG. 3 is a flowchart of a method for scalable storage cluster mirroring from the perspective of an agent executing on a storage node according to one implementation.

FIG. 3 is a flowchart of a method for scalable storage cluster mirroring from the perspective of the agent 40-1 according to one implementation. FIG. 3 will be discussed in conjunction with FIG. 1. The agent 40-1 determines the data modification rate 54-1 at which the storage segments 31 are being modified on the storage node 24-1 (FIG. 3, block 2000). The agent 40-1 sends the data modification rate 54-1 to the cluster manager 38 (FIG. 3, block 2002).

Figure 4:
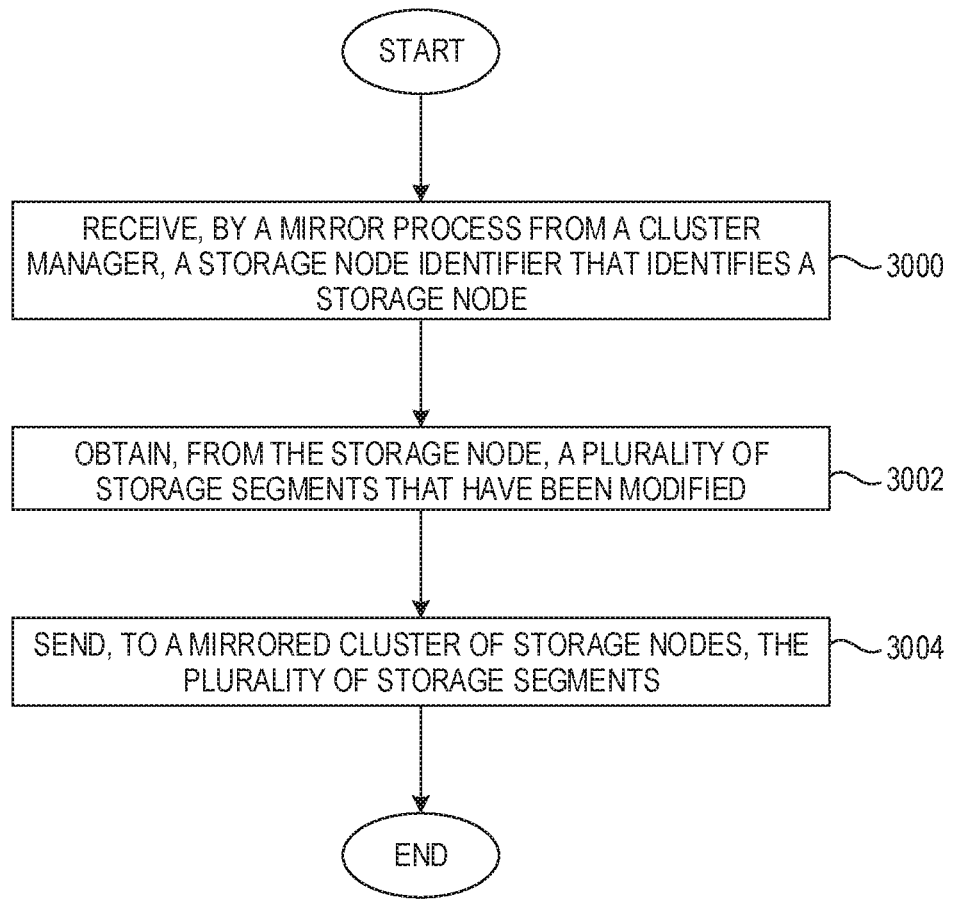
FIG. 4 is a flowchart of a method for scalable storage cluster mirroring from the perspective of a mirror process according to one implementation.

FIG. 4 is a flowchart of a method for scalable storage cluster mirroring from the perspective of the mirror process 56 according to one implementation. FIG. 4 will be discussed in conjunction with FIG. 1. The mirror process 56 receives, from the cluster manager 38, the storage node identifier 60 that identifies the storage node 24-1 (FIG. 3, block 3000). The mirror process 56 obtains, from the storage node 24-1, the plurality of storage segments 31 that have been modified (FIG. 3, block 3002). The mirror process 56 sends, to the mirrored cluster of storage nodes 44, the plurality of storage segments 31 (FIG. 3, block 3004).

Figure 5:
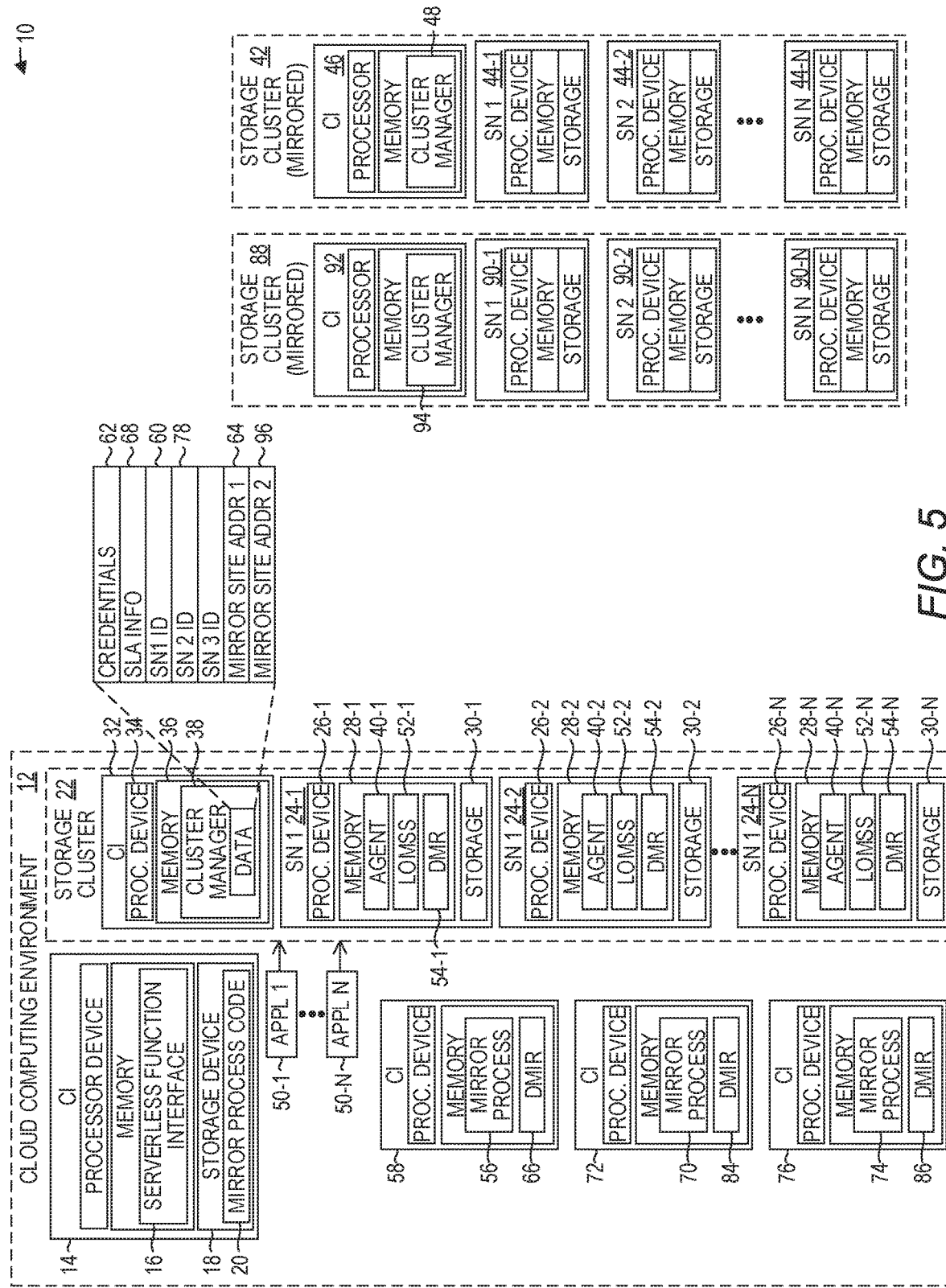
FIG. 5 is a block diagram of the environment illustrated in FIG. 1 according to another implementation.

FIG. 5 is a block diagram of the environment 10 illustrated in FIG. 1 according to another implementation. In this implementation, the environment 10 includes an additional storage cluster 88 that includes a plurality of storage nodes 90-1-90-N, and to which the storage segments on the storage devices 30-1-30-N are mirrored, as discussed in greater detail below. The storage cluster 88 also includes a compute instance 92 on which a cluster manager 94 executes. When the cluster manager 38 initiates the mirror processes 56, 70, and 74, as discussed above with regard to FIG. 1, the cluster manager 94 provides, to each of the mirror processes 56, 70, and 74, the address 64 of the storage cluster 42 and also an address 96 of the storage cluster 88. Each of the mirror processes 56, 70, and 74 then copy modified storage segments from the storage nodes 24-1, 24-2 to both the storage cluster 42 and the storage cluster 88.

Figure 6:
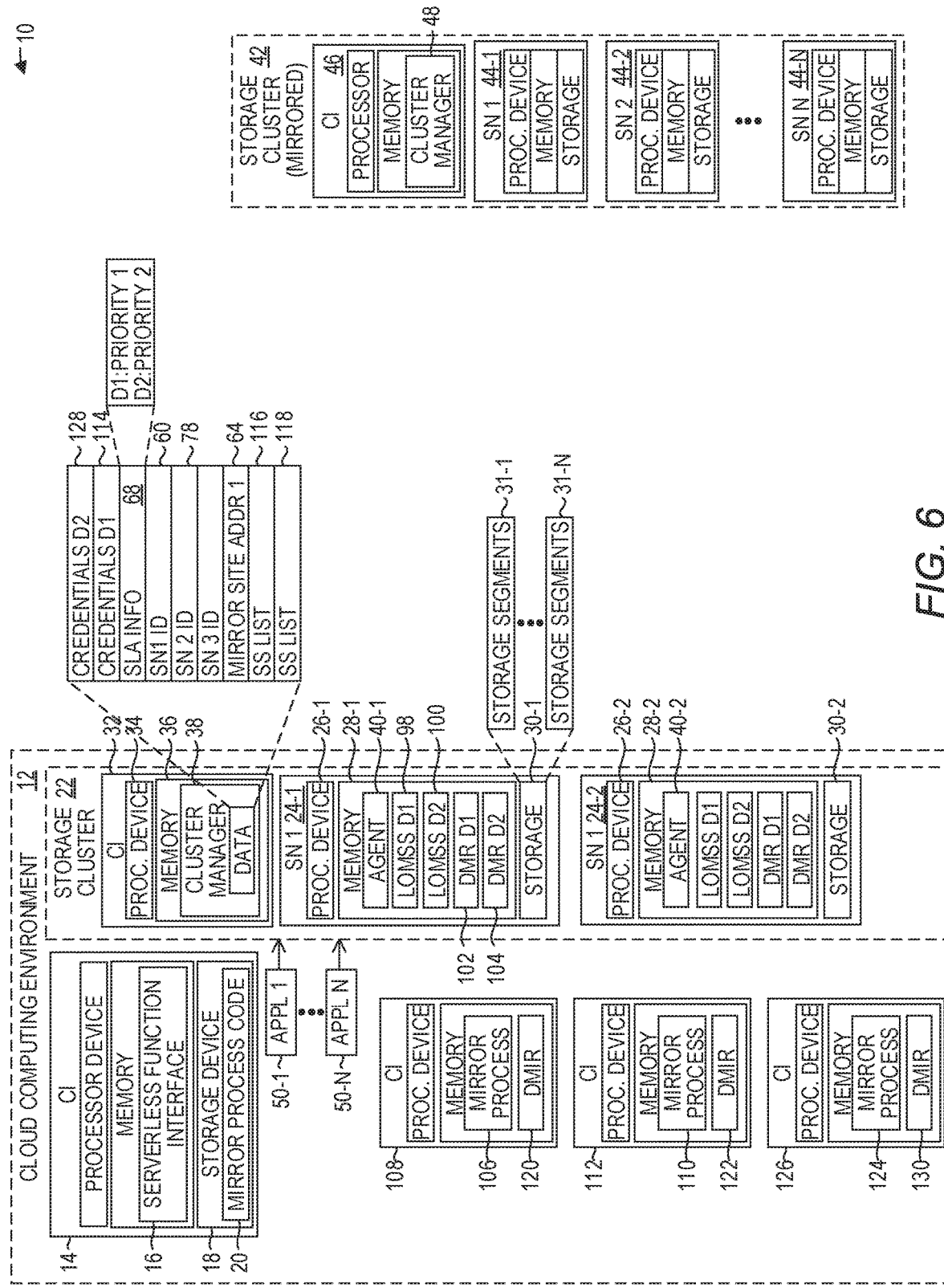
FIG. 6 is a block diagram of the environment illustrated in FIG. 1 according to another implementation.

FIG. 6 is a block diagram of the environment 10 illustrated in FIG. 1 according to another implementation. Note that only two storage nodes 24-1-24-2 are illustrated due to space limitations in FIG. 2. In this implementation, the applications 50-1-50-N are associated with two different divisions of the same company. For example, some of the applications 50-1-50-N are associated with a mergers and acquisitions division (i.e., sometimes referred to herein as division 1), and some of the applications 50-1-50-N are associated with a human resources division (i.e., sometimes referred to herein as division 2). Neither division is to be given access to data of the other division, and the enterprise has prioritized the mergers and acquisitions division over the human resources division for purposes of mirroring data segments to the storage cluster 42.

As the applications 50 modify storage segments of the storage node 24-1, the agent 40-1 maintains a list of modified storage segments 98 that identifies the modified storage segments 31 that are associated with division 1, and a list of modified storage segments 100 that identifies the modified storage segments 31 that are associated with division 2. The agent 40-2 maintains similar lists of modified storage segments for the two different divisions.

The agent 40-1 also determines a data modification rate 102 that identifies a rate at which the storage segments 31 associated with division 1 are being modified, and a data modification rate 104 that identifies a rate at which the storage segments 31 associated with division 2 are being modified. The agent 40-1 periodically sends the data modification rates 102, 104 to the cluster manager 38 along with information that identifies the divisions to which the respective data modification rates 102, 104 correspond.

The cluster manager 38 receives the data modification rates 102, 104 and accesses the SLA information 68. The SLA information 68 indicates that division 1 has a higher priority than division 2. The prioritization may be expressed in any desired manner, including simply a ranking, or, in other implementations, by a higher guaranteed data mirror rate. Based on the data modification rate 102 and the SLA information 68 that indicates that division 1 has a higher priority than division 2, the cluster manager 38 invokes the serverless function interface 16 to cause the initiation of a mirror process 106 on a compute instance 108, and the initiation of a mirror process 110 on a compute instance 112. The cluster manager 38 communicates information to the mirror processes 106, 110 including, by way of non-limiting example, the storage node identifier 60 that identifies the storage node 24-1, authentication credentials 114 that are required by the storage node 24-1 to gain access to the storage segments 31 of the storage node 24-1 that are associated with division 1, and an address 64 of the storage cluster 42 to which the modified storage segments are to be copied.

The cluster manager 38 requests, from the storage node 24-2, the list of modified storage segments 98. The cluster manager 38 selects a first subset of storage segments identified on the list of modified storage segments 98 and populates a list 116 with the first subset of storage segments. The cluster manager 38 selects a second subset of storage segments identified on the list of modified storage segments 98 and populates a list 118 with the second subset of storage segments. Each of the storage segments identified on the list of modified storage segments 98 is identified in either the list 116 or the list 118. The cluster manager 38 communicates the list 116 to the mirror process 106 and communicates the list 118 to the mirror process 110.

Each of the mirror processes authenticates with the storage node 24-1 using the authentication credentials 114, and begins copying the storage segments 31 identified on the lists 116, 118, respectively to the storage cluster 42. The mirror processes 106, 110 periodically generate data mirror rates 120, 122, respectively, that identify the real-time rates at which the mirror processes 106, 110 send the modified storage segments 31 of the storage node 24-1 to the storage cluster 42. The agent 40-1 also periodically determines the data modification rate 102 that identifies a rate at which the storage segments 31 on the respective storage node 24-1 that belong to division 1 are being modified. The cluster manager 38 receives the data mirror rates 120, 122, and the data modification rate 102 to determine whether the rate at which the modified storage segments 31 are being copied to the storage cluster 42, given the rate at which storage segments 31 are being modified, meets the guaranteed data mirror rate associated with division 1 identified in the SLA information 68.

Based on the data modification rate 104 and the SLA information 68 that indicates that division 2 has a lower priority than division 1, the cluster manager 38 invokes the serverless function interface 16 to cause the initiation of a mirror process 124 on a compute instance 126. The cluster manager 38 communicates information to the mirror process 124, including, by way of non-limiting example, the storage node identifier 60 that identifies the storage node 24-1, authentication credentials 128 that are required by the storage node 24-1 to gain access to the storage segments 31 of the storage node 24-1 that are associated with division 2, and an address 64 of the storage cluster 42 to which the modified storage segments are to be copied.

The mirror process 124 authenticates with the storage node 24-1 using the authentication credentials 128, and begins copying the storage segments 31 identified on the list of modified storage segments 100 to the storage cluster 42. The mirror process 124 periodically generates a data mirror rate 130 that identifies a real-time rate at which the mirror process 124 sends the modified storage segments 31 of the storage node 24-1 to the storage cluster 42. The agent 40-1 also periodically determines the data modification rate 104 that identifies a rate at which the storage segments 31 on the respective storage node 24-1 that belong to division 2 are being modified. The cluster manager 38 receives the data mirror rate 130 and the data modification rate 104 to determine whether the rate at which the modified storage segments 31 are being copied to the storage cluster 42 given the rate at which storage segments 31 are being modified meets the guaranteed data mirror rate associated with division 2 identified in the SLA information 68.

Figure 7:
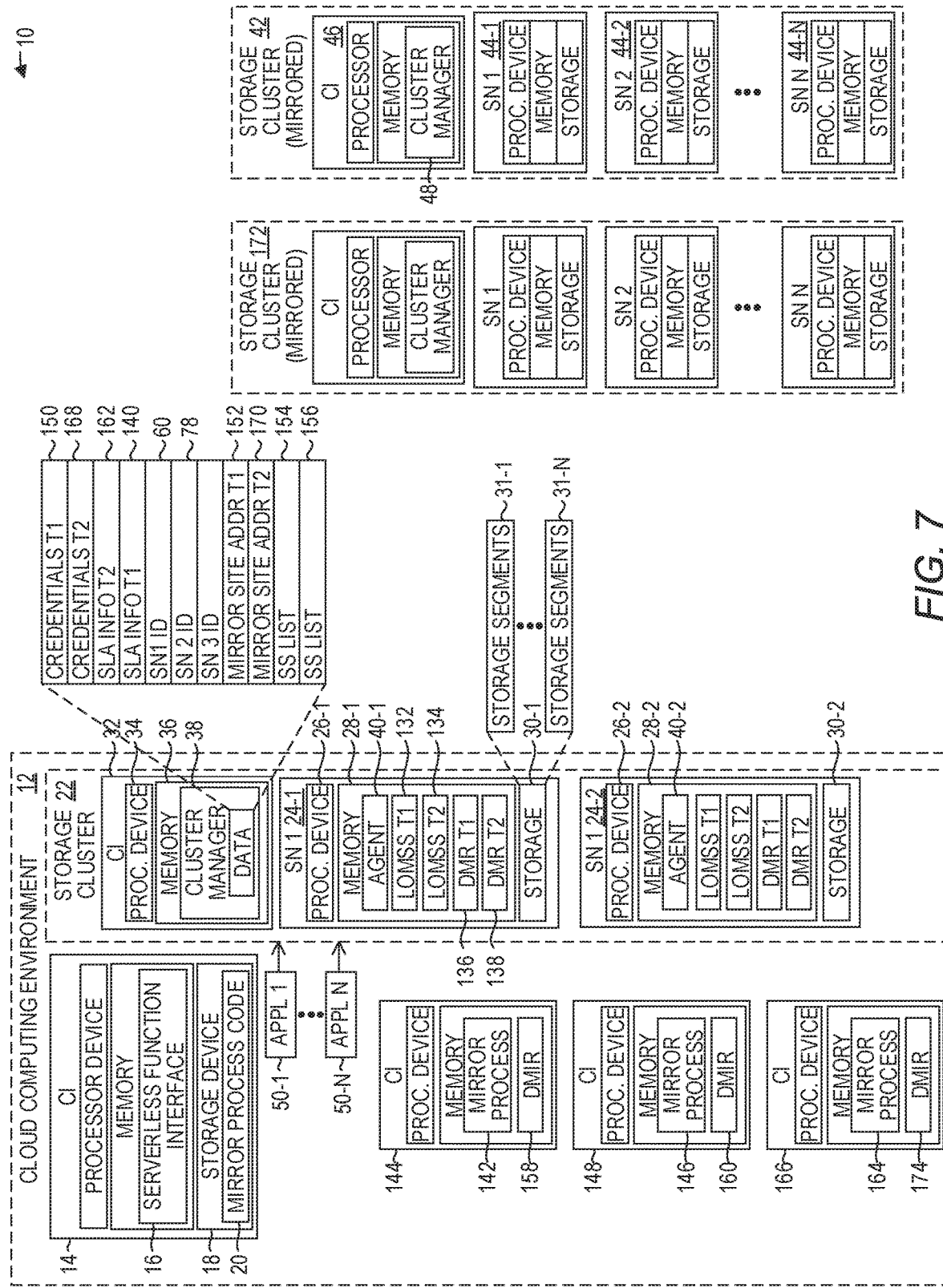
FIG. 7 is a block diagram of the environment illustrated in FIG. 1 according to another implementation.

FIG. 7 is a block diagram of the environment 10 illustrated in FIG. 1 according to another implementation. Note that only two storage nodes 24-1-24-2 are illustrated due to space limitations in FIG. 2. In this implementation, the applications 50-1-50-N are associated with two different enterprises (i.e., different businesses) that both utilize the same cloud computing provider that implements the cloud computing environment 12. Different businesses are sometimes referred to as tenants. Thus, some of the applications 50-1-50-N are associated with tenant 1 and some of the applications 50-1-50-N are associated with tenant 2. Applications 50-1-50-N that are associated with tenant 1 cannot be permitted to access storage segments 31 that are associated with tenant 2, and applications 50-1-50-N that are associated with tenant 2 cannot be permitted to access storage segments 31 that are associated with tenant 1.

As the applications 50 modify storage segments of the storage node 24-1, the agent 40-1 maintains a list of modified storage segments 132 that identifies the modified storage segments 31 that are associated with tenant 1, and a list of modified storage segments 134 that identifies the modified storage segments 31 that are associated with tenant 2. The agent 40-2 maintains similar lists of modified storage segments for the two different tenants.

The agent 40-1 also determines a data modification rate 136 that identifies a rate at which the storage segments 31 associated with tenant 1 are being modified, and a data modification rate 138 that identifies a rate at which the storage segments 31 associated with tenant 2 are being modified. The agent 40-1 periodically sends the data modification rates 136, 138 to the cluster manager 38 along with information that identifies the tenants to which the respective data modification rates 136, 138 correspond.

The cluster manager 38 receives the data modification rate 136 and accesses SLA information 140. The SLA information 140 indicates that tenant 1 has a particular guaranteed data mirror rate. Based on the data modification rate 136 and the SLA information 140, the cluster manager 38 invokes the serverless function interface 16 to cause the initiation of a mirror process 142 on a compute instance 144, and the initiation of a mirror process 146 on a compute instance 148. The cluster manager 38 communicates information to the mirror processes 142, 146 including, by way of non-limiting example, the storage node identifier 60 that identifies the storage node 24-1, authentication credentials 150 that are required by the storage node 24-1 to gain access to the storage segments 31 of the storage node 24-1 that are associated with tenant 1, and an address 152 of the storage cluster 42 to which the modified storage segments 31 associated with the tenant 1 are to be copied.

The cluster manager 38 requests, from the storage node 24-1, the list of modified storage segments 132. The cluster manager 38 selects a first subset of storage segments identified on the list of modified storage segments 132 and populates a list 154 with the first subset of storage segments. The cluster manager 38 selects a second subset of storage segments identified on the list of modified storage segments 132 and populates a list 156 with the second subset of storage segments. Each of the storage segments 31 identified on the list of modified storage segments 132 is identified in either the list 154 or the list 156. The cluster manager 38 communicates the list 154 to the mirror process 142 and communicates the list 156 to the mirror process 146.

Each of the mirror processes 142, 146 authenticate with the storage node 24-1 using the authentication credentials 150, and begin copying the storage segments 31 identified on the lists 154, 156, respectively to the storage cluster 42. The mirror processes 142, 146 periodically generate data mirror rates 158, 160, respectively, that identify the real-time rates at which the mirror processes 142, 146 send the modified storage segments 31 of the storage node 24-1 to the storage cluster 42. The agent 40-1 also periodically determines the data modification rate 136 that identifies a rate at which the storage segments 31 on the respective storage node 24-1 that belong to tenant 1 are being modified. The cluster manager 38 receives the data mirror rates 158, 160 and the data modification rate 136 to determine whether the rate at which the modified storage segments 31 are being copied to the storage cluster 42 given the rate at which storage segments 31 are being modified meets the guaranteed data mirror rate associated with tenant 1 and identified in the SLA information 140.

The cluster manager 38 receives the data modification rate 138 and accesses SLA information 162. The SLA information 162 indicates that tenant 2 has a particular guaranteed data mirror rate that is lower than that of tenant 1. Based on the data modification rate 138 and the SLA information 162, the cluster manager 38 invokes the serverless function interface 16 to cause the initiation of a mirror process 164 on a compute instance 166. The cluster manager 38 communicates information to the mirror process 164 including, by way of non-limiting example, the storage node identifier 60 that identifies the storage node 24-1, authentication credentials 168 that are required by the storage node 24-1 to gain access to the storage segments 31 of the storage node 24-1 that are associated with tenant 2, and an address 170 of a storage cluster 172 to which the modified storage segments 31 associated with the tenant 2 are to be copied.

The cluster manager 38 requests, from the storage node 24-1, the list of modified storage segments 134. The cluster manager 38 communicates the list of modified storage segments 134 to the mirror process 164. The mirror process 164 authenticates with the storage node 24-1 using the authentication credentials 168, and begins copying the storage segments 31 identified on the list of modified storage segments 134 to the storage cluster 172. The mirror process 164 periodically generates a data mirror rate 174 that identifies a real-time rate at which the mirror process 164 sends the modified storage segments 31 of the storage node 24-1 to the storage cluster 172. The agent 40-1 also periodically determines the data modification rate 138 that identifies a rate at which the storage segments 31 on the respective storage node 24-1 that belong to tenant 2 are being modified. The cluster manager 38 receives the data mirror rate 174 and the data modification rate 138 to determine whether the rate at which the modified storage segments 31 are being copied to the storage cluster 172 given the rate at which storage segments 31 are being modified meets the guaranteed data mirror rate associated with tenant 2 identified in the SLA information 162.

Figure 8A:
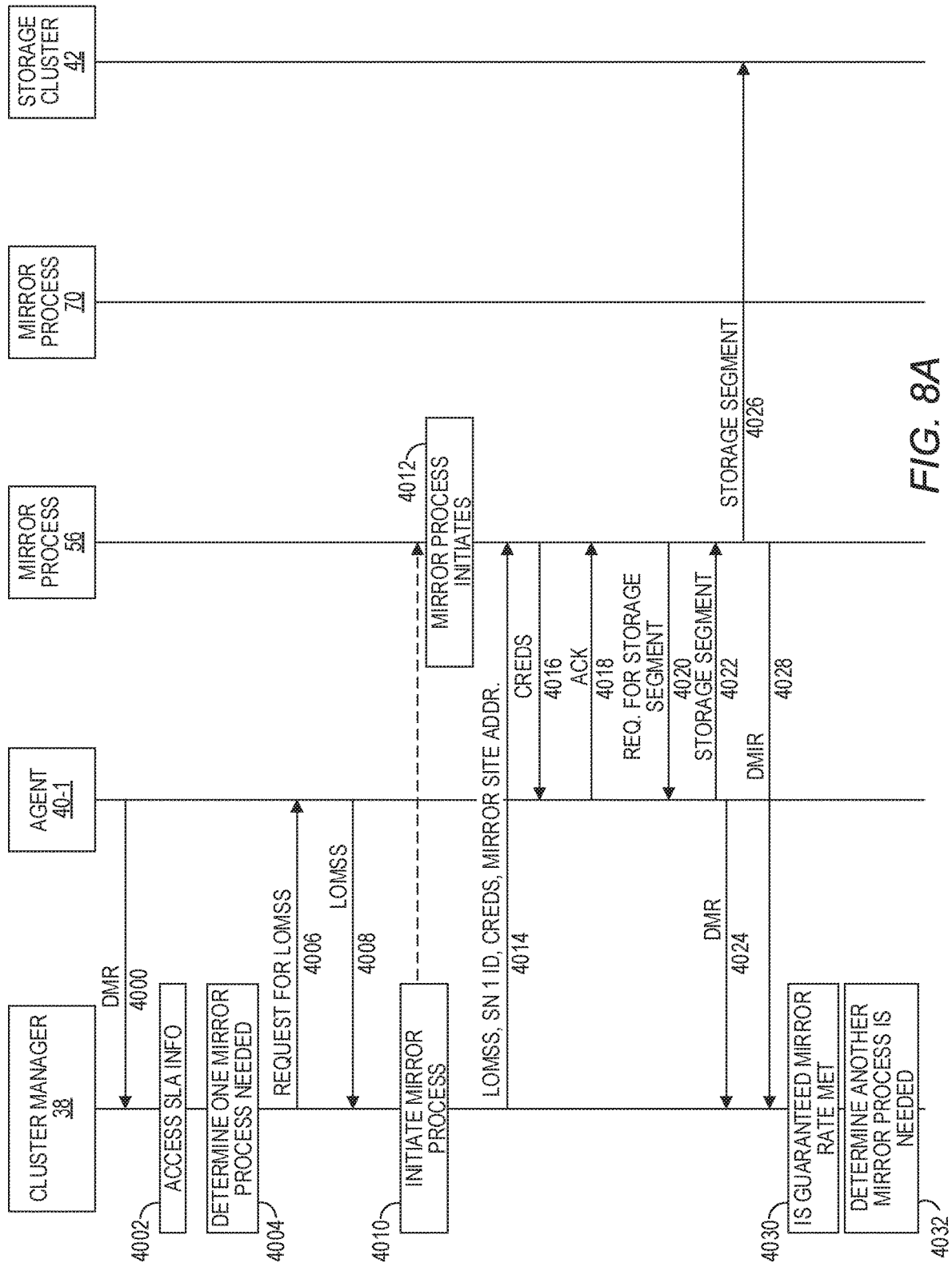
FIGS. 8A-8C are message sequence diagrams illustrating example messages communicated between components and actions taken by components during scalable storage cluster mirroring according to one implementation.
Figure 8B:
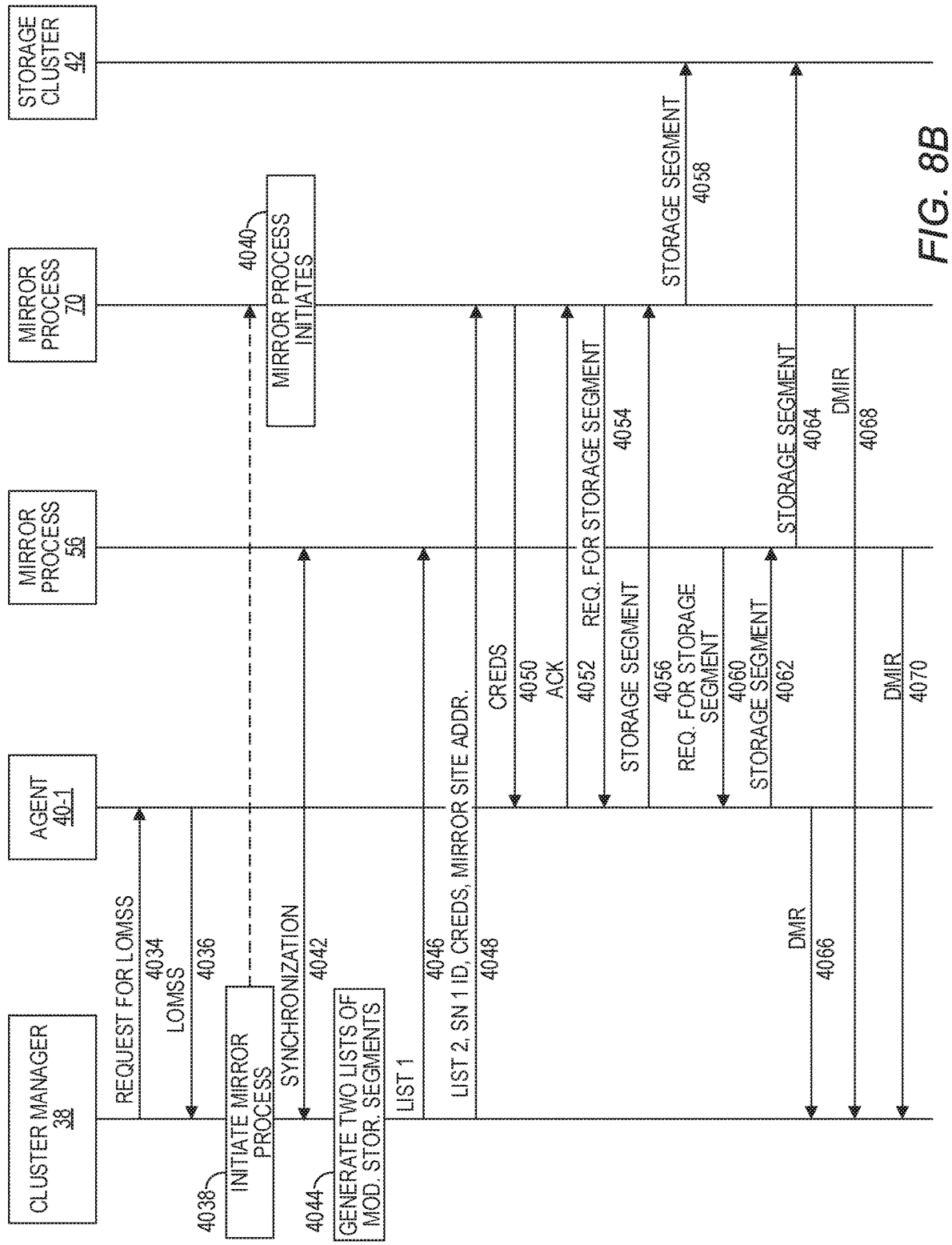
Figure 8C:
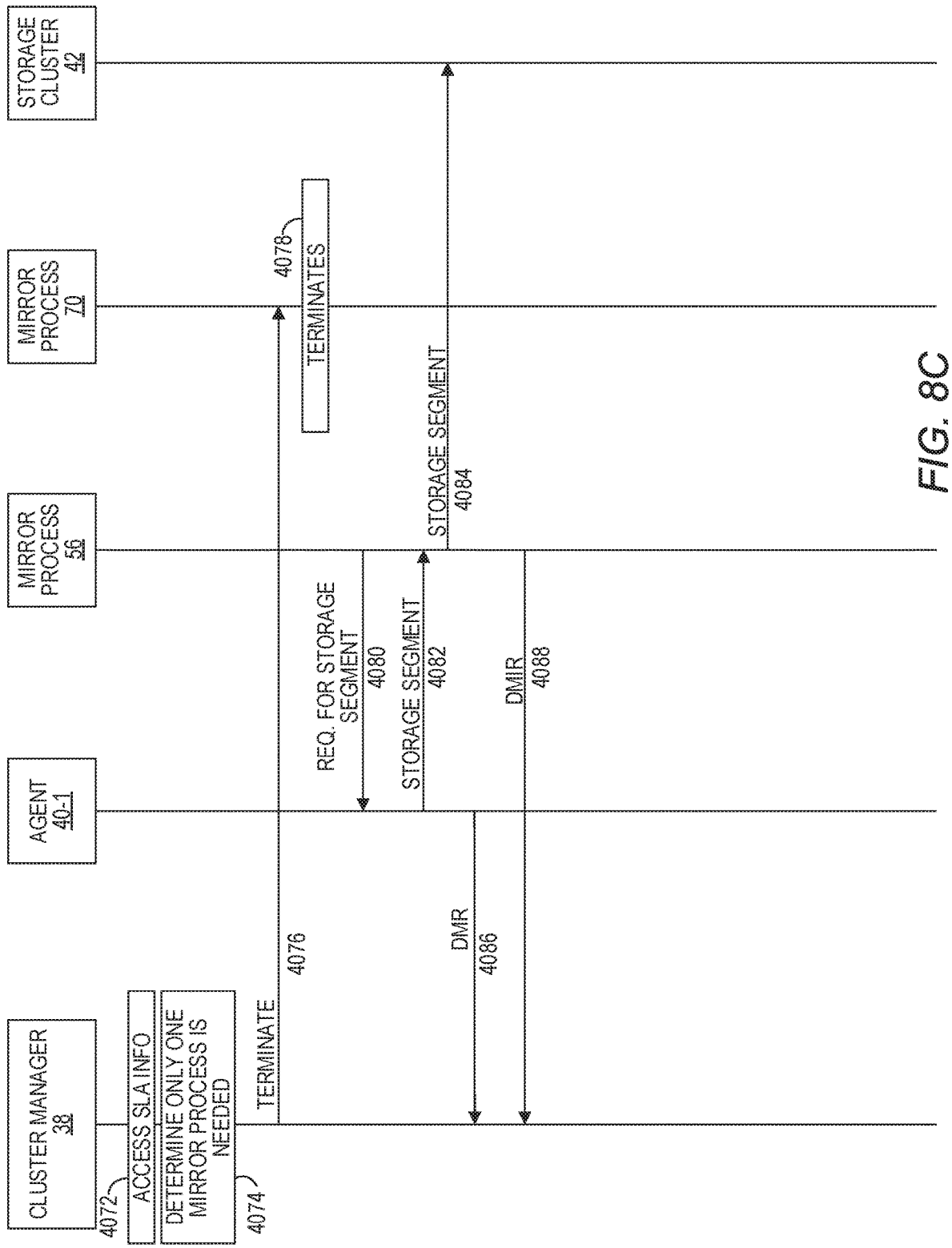

FIGS. 8A-8C are message sequence diagrams illustrating example messages communicated between components and actions taken by components during scalable storage cluster mirroring according to one implementation. Referring first to FIG. 8A, the cluster manager 38 receives a data modification rate from the agent 40-1 that identifies a rate at which storage segments are being modified on the storage node 24-1 (step 4000). The cluster manager 38 accesses the SLA information 68 and, based on the guaranteed data mirror rate and the data modification rate, determines that a single mirror process is initially needed to mirror modified data segments from the storage node 24-1 to the storage cluster 42 (steps 4002-4004).

The cluster manager 38 requests the list of modified storage segments 52-1 from the agent 40-1 (step 4006). The agent 40-1 sends the list of modified storage segments 52-1 to the cluster manager 38 (step 4008). The cluster manager 38 initiates the mirror process 56 (steps 4010-4012). The cluster manager 38 communicates the list of modified storage segments 52-1, the storage node identifier 60, the authentication credentials 62 and the mirror site address 64 to the mirror process 56 (step 4014).

The mirror process 56 sends the authentication credentials 62 to the agent 40-1 (step 4016). The agent 40-1 verifies that the credentials are correct, and sends an acknowledgement to the mirror process 56 (step 4018). An iteration of a number of steps begins. The mirror process 56 sends a request for one or more storage segments identified on the list of modified storage segments 52-1 to the agent 40-1 (step 4020). The agent 40-1 sends the requested storage segments to the mirror process 56 (step 4022). Periodically, the agent 40-1 sends a data modification rate to the cluster manager 38 (step 4024). The mirror process 56 sends the storage segments received from the agent 40-1 to the storage cluster 42 (step 4026). Periodically, the mirror process 56 sends a data mirror rate to the cluster manager 38 (step 4028). The cluster manager 38 analyzes the data modification rate, the data mirror rate, and the guaranteed mirror rate from the SLA information 68 to determine if the rate at which the mirror process 56 is sending the storage segments to the storage cluster 42 in view of the rate at which storage segments are being modified comply with the guaranteed mirror rate (step 4030). The steps 4018-4030 may repeat any number of times.

In this example, at some point in time, the cluster manager 38 determines that the rate at which the mirror process 56 is sending the storage segments to the storage cluster 42 in view of the rate at which storage segments are being modified do not (or soon will not) comply with the guaranteed mirror rate (step 4032).

Referring now to FIG. 8B, the cluster manager 38 requests the list of modified storage segments 52-1 from the agent 40-1 (step 4034). The agent 40-1 sends the list of modified storage segments 52-1 to the cluster manager 38 (step 4036). The cluster manager 38 initiates the mirror process 70 (steps 4038-4040). The cluster manager 38 may enter into one or more communications with the mirror process 56 to synchronize the storage segments that the mirror process 56 has already sent to the storage cluster 42 and the storage segments identified on the list of modified storage segments 52-1 (step 4042). This process may involve an instruction to the mirror process 56 to temporarily halt sending storage segments to the storage cluster 42. Once the cluster manager 38 determines what storage segments on the list of modified storage segments 52-1 remain to be sent to the storage cluster 42, the cluster manager 38 selects a first subset of storage segments identified on the list of modified storage segments 52-1 and populates a first list with the first subset of storage segments. The cluster manager 38 selects a second subset of storage segments identified on the list of modified storage segments 52-1 and populates a second list with the second subset of storage segments (step 4044).

The cluster manager 38 sends the first list to the mirror process 56 and instructs the mirror process 56 to resume processing (step 4046). The cluster manager 38 communicates the second list of modified storage segments, the storage node identifier 60, the authentication credentials 62 and the mirror site address 64 to the mirror process 70 (step 4048). The mirror process 70 sends the authentication credentials 62 to the agent 40-1 (step 4050). The agent 40-1 verifies that the credentials are correct, and sends an acknowledgement to the mirror process 70 (step 4052). An iteration of a number of steps begins. The mirror process 70 sends a request for one or more storage segments identified on the second list of modified storage segments to the agent 40-1 (step 4054). The agent 40-1 sends the requested storage segments to the mirror process 70 (step 4056). The mirror process 70 sends the storage segments received from the agent 40-1 to the storage cluster 42 (step 4058). Concurrently with these steps, the mirror process 56 sends a request for one or more storage segments identified on the first list of modified storage segments to the agent 40-1 (step 4060). The agent 40-1 sends the requested storage segments to the mirror process 56 (step 4062). The mirror process 56 sends the storage segments received from the agent 40-1 to the storage cluster 42 (step 4064). Periodically, the agent 40-1 sends a data modification rate to the cluster manager 38 (step 4066). Periodically, the mirror process 70 sends a data mirror rate to the cluster manager 38 (step 4068). Periodically, the mirror process 56 sends a data mirror rate to the cluster manager 38 (step 4070).

Referring now to FIG. 8C, the cluster manager 38 analyzes the data modification rates received from the mirror processes 56, 70, the data mirror rate, and the guaranteed mirror rate from the SLA information 68 to determine if the rate at which the mirror processes 56, 70 are sending the storage segments to the storage cluster 42 in view of the rate at which storage segments are being modified comply with the guaranteed mirror rate (step 4072). The steps 4054-4072 may repeat any number of times.

In this example, at some point in time, the cluster manager 38 determines that the rate at which storage segments are being modified has decreased to a level that the data mirror rate of the mirror process 56 is sufficient to comply with the guaranteed mirror rate (step 4074). The cluster manager 38 sends an instruction to the mirror process 70 to terminate (step 4076). The mirror process 70 terminates, reducing memory and CPU utilization (step 4078). The mirror process 56 continues to iteratively request additional modified storage segments from the agent 40-1 and to send such modified storage segments to the storage cluster 42 (steps 4080-4084). Periodically, the agent 40-1 sends a data modification rate to the cluster manager 38 (step 4086). Periodically, the mirror process 56 sends a data mirror rate to the cluster manager 38 (step 4088). This process can continue indefinitely until the cluster manager 38 again determines either to terminate the mirror process 56, or to initiate another mirror process.

Figure 9:
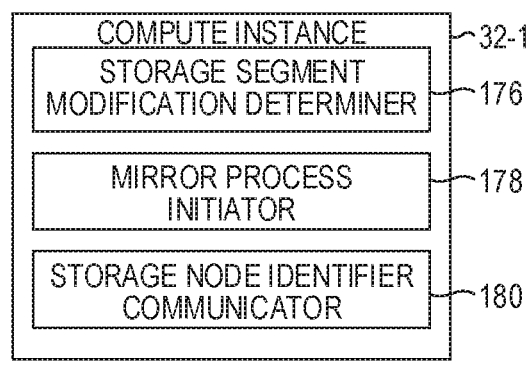
FIG. 9 is a block diagram of a compute instance suitable for implementing scalable storage cluster mirroring according to one implementation.

FIG. 9 is a block diagram of a compute instance 32-1 suitable for implementing scalable storage cluster mirroring according to one implementation. The compute instance 32 includes a storage segment modification determiner 176 that is configured to determine that a storage segment has been modified. In some implementations, this may involve the receipt of information, such as a data modification rate, or any other suitable information, from an agent executing on a storage node. The storage segment modification determiner 176 may comprise executable software instructions configured to program a processor device to implement the functionality of determining that a storage segment has been modified, may comprise circuitry including, by way of non-limiting example, an application-specific integrated circuit (ASIC) or field-programmable gate array (FPGA), or may comprise a combination of executable software instructions and circuitry.

The compute instance 32-1 also includes a mirror process initiator 178 that is configured to initiate a mirror process upon request. In some implementations, this may involve interfacing with a serverless function interface, such as the serverless function interface 16, of a cloud computing environment. The mirror process initiator 178 may comprise executable software instructions configured to cause a serverless function interface to initiate a mirror process, may comprise circuitry including, by way of non-limiting example, an ASIC or FPGA, or may comprise a combination of executable software instructions and circuitry.

The compute instance 32-1 also includes a storage node identifier communicator 180 that is configured to communicate a storage node identifier to a mirror process. This may be accomplished via any suitable inter-process communications mechanism. The storage node identifier communicator 180 may comprise executable software instructions configured to communicate a storage node identifier to a mirror process, may comprise circuitry including, by way of non-limiting example, an ASIC or FPGA, or may comprise a combination of executable software instructions and circuitry.

Figure 10:
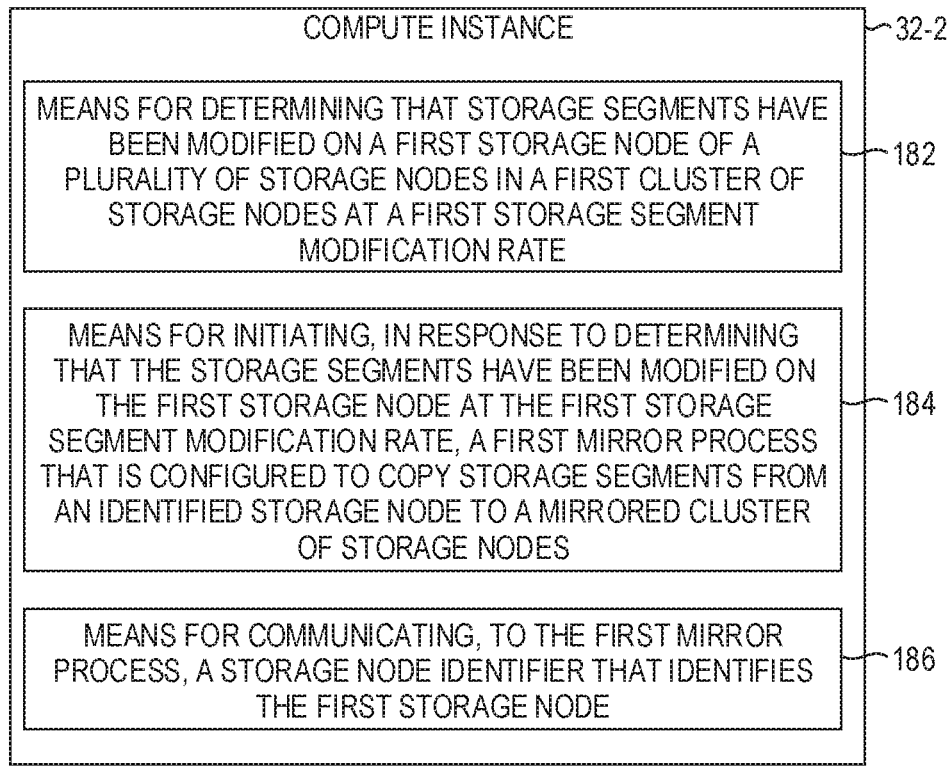
FIG. 10 is a block diagram of a compute instance suitable for implementing scalable storage cluster mirroring according to another implementation.

FIG. 10 is a block diagram of a compute instance 32-2 suitable for implementing scalable storage cluster mirroring according to another implementation. The compute instance 32-2 includes a means 182 for determining that storage segments have been modified on a first storage node of a plurality of storage nodes in a first cluster of storage nodes at a first storage segment modification rate. The means 182 may be implemented in any number of manners, including, for example, via the storage segment modification determiner 176 illustrated in FIG. 9.

The compute instance 32-2 includes a means 184 for initiating, in response to determining that the storage segments have been modified on the first storage node at the first storage segment modification rate, a first mirror process that is configured to copy storage segments from an identified storage node to a mirrored cluster of storage nodes. The means 184 may be implemented in any number of manners, including, for example, via the mirror process initiator 178 illustrated in FIG. 9. The compute instance 32-2 includes a means for 186 communicating, to the first mirror process, a storage node identifier that identifies the first storage node. The means 186 may be implemented in any number of manners, including, for example, via the storage node identifier communicator 180 illustrated in FIG. 9.

Figure 11:
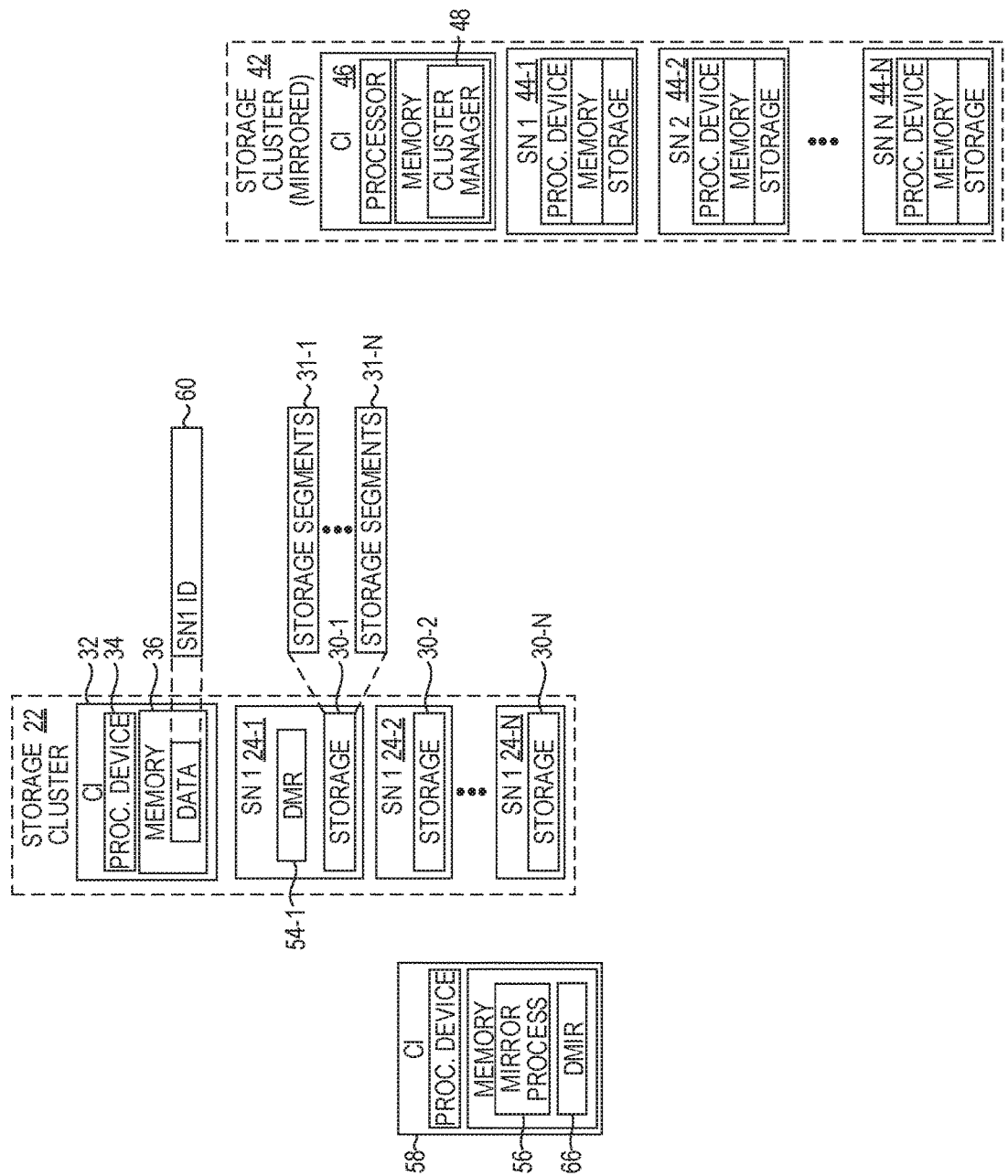
FIG. 11 is a simplified block diagram of the environment illustrated in FIG. 1 according to one implementation.

FIG. 11 is a simplified block diagram of the environment 10 illustrated in FIG. 1 according to one implementation. The compute instance 32 includes the processor device 34 coupled to the memory 36. The processor device 34 is to determine that the storage segments 31 have been modified on the storage node 24-1 of the plurality of storage nodes 24-1-24-N in the cluster 22 of storage nodes 24-1-24-N at the data modification rate 54-1. In response to determining that the storage segments 31 have been modified on the storage node 24-1 at the data modification rate 54-1, the processor device 34 is further to initiate the mirror process 56 that is configured to copy storage segments from an identified storage node to a mirrored cluster of storage nodes. The processor device 34 is further to communicate, to the mirror process 56, the storage node identifier 60 that identifies the storage node 24-1.

Figure 12:
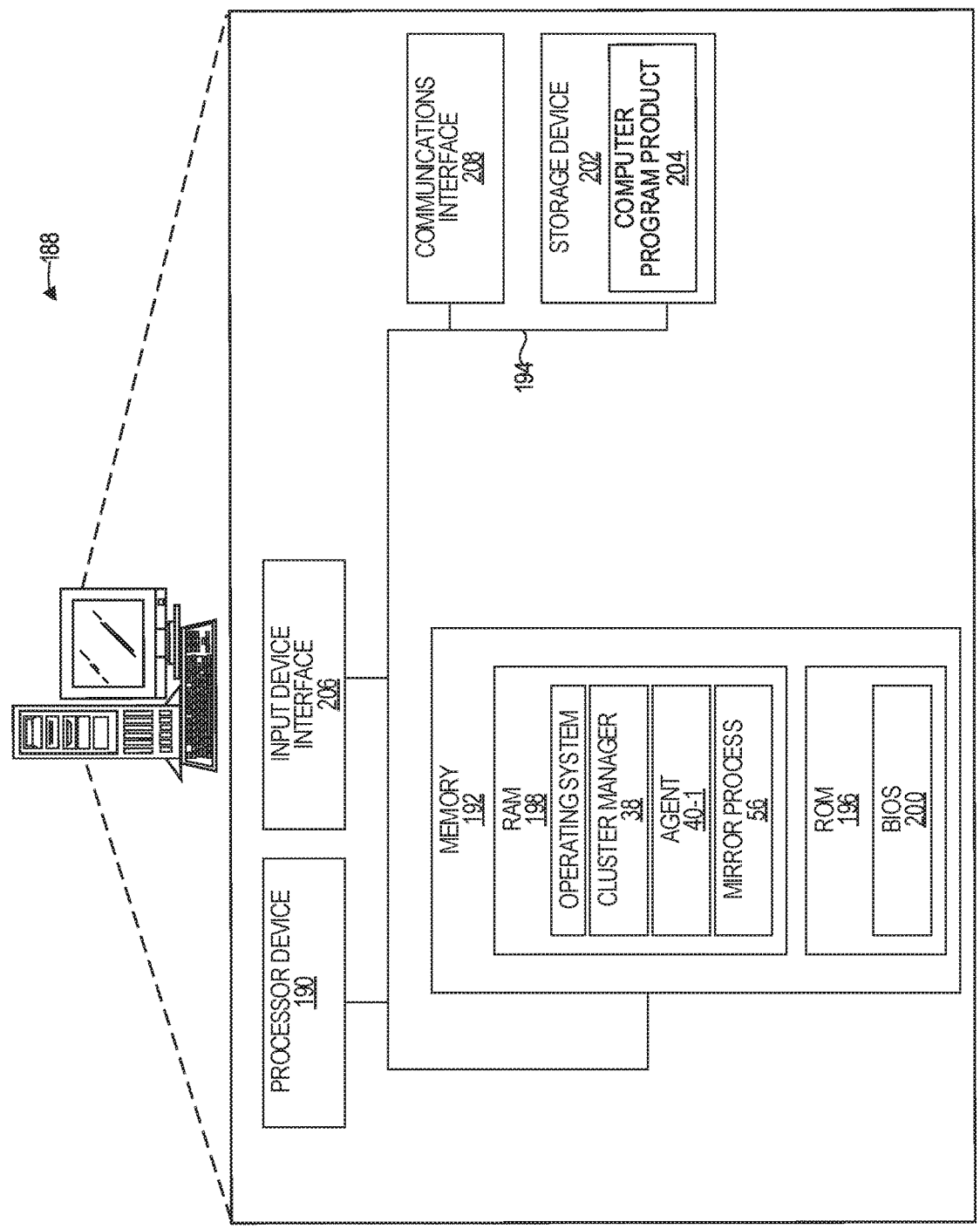
FIG. 12 is a block diagram of a computing device that is suitable for implementing various components.

FIG. 12 is a block diagram of a computing device 188 that is suitable for implementing various components illustrated in the environment 10, including, for example, the compute instance 32, the compute instance 58, and the storage node 24-1. The computing device 188 may comprise any computing or electronic device capable of including firmware, hardware, and/or executing software instructions to implement the functionality described herein, such as a computer server, a desktop computing device, a laptop computing device, a smartphone, a computing tablet, or the like. The computing device 188 includes the processor device 190, a system memory 192, and a system bus 194. The system bus 194 provides an interface for system components including, but not limited to, the system memory 192 and the processor device 190. The processor device 190 can be any commercially available or proprietary processor.

The system bus 194 may be any of several types of bus structures that may further interconnect to a memory bus (with or without a memory controller), a peripheral bus, and/or a local bus using any of a variety of commercially available bus architectures. The system memory 192 may include non-volatile memory 196 (e.g., read-only memory (ROM), erasable programmable read-only memory (EPROM), electrically erasable programmable read-only memory (EEPROM), etc.), and volatile memory 198 (e.g., random-access memory (RAM)). A basic input/output system (BIOS) 200 may be stored in the non-volatile memory 196 and can include the basic routines that help to transfer information between elements within the computing device 188. The volatile memory 198 may also include a high-speed RAM, such as static RAM, for caching data.

The computing device 188 may further include or be coupled to a non-transitory computer-readable storage medium such as a storage device 202, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 202 and other drives associated with computer-readable media and computer-usable media may provide non-volatile storage of data, data structures, computer-executable instructions, and the like.

A number of modules can be stored in the storage device 202 and in the volatile memory 198, including an operating system and one or more program modules, such as the cluster manager 38, the mirror process 56, or the agent 40-1, which may implement the functionality described herein in whole or in part.

All or a portion of the examples may be implemented as a computer program product 204 stored on a transitory or non-transitory computer-usable or computer-readable storage medium, such as the storage device 202, which includes complex programming instructions, such as complex computer-readable program code, to cause the processor device 190 to carry out the steps described herein. Thus, the computer-readable program code can comprise software instructions for implementing the functionality of the examples described herein when executed on the processor device 190.

An operator may also be able to enter one or more configuration commands through a keyboard (not illustrated), a pointing device such as a mouse (not illustrated), or a touch-sensitive surface such as a display device. Such input devices may be connected to the processor device 190 through an input device interface 206 that is coupled to the system bus 194 but can be connected by other interfaces such as a parallel port, an Institute of Electrical and Electronic Engineers (IEEE) 1394 serial port, a Universal Serial Bus (USB) port, an IR interface, and the like. The computing device 188 may also include a communications interface 208 suitable for communicating with a network as appropriate or desired.

Other computer system designs and configurations may also be suitable to implement the systems and methods described herein. The following examples illustrate various additional implementations in accordance with one or more aspects of the disclosure.

Example 1 is a method that includes determining, by an agent executing on a storage node, a first data modification rate at which first storage segments are being modified on the storage node; and sending the first data modification rate to a cluster manager.

Example 2 is the method of example 1 wherein the first storage segments are associated with a first division of an enterprise; and wherein the method further includes determining, by the agent, a second data modification rate at which second storage segments associated with a second division of the enterprise are being modified on the storage node; and sending the second data modification rate to the cluster manager.

Example 3 is the method of example 1 wherein the method further includes receiving, by the storage node, a request from the cluster manager for a list of storage segment identifiers that identify storage segments that have been modified on the storage node; and sending, by the storage node to the cluster manager, the list of storage segment identifiers that identify the storage segments that have been modified on the storage node.

Example 4 is the method of example 1 wherein the method further includes receiving, by the storage node, over a period of time, modifications to the first storage segments from a plurality of applications.

Example 5 is the method of example 1 wherein the first storage segments are associated with a first tenant; and wherein the method further includes determining, by the agent, a second data modification rate at which second storage segments associated with a second tenant are being modified on the storage node; and sending the second data modification rate to the cluster manager.

Example 6 is the method of example 1 wherein the method further includes receiving, by the storage node from a mirror process, a request for a list of modified storage segments; and providing, to the mirror process, the list of modified storage segments.

Example 7 is the method of example 6 wherein the method further includes receiving, from the mirror process, authentication credentials associated with the modified storage segments; and determining that the authentication credentials are valid.

Example 8 is a storage node that includes a memory and a processor device coupled to the memory. The processor device is to determine, by an agent executing on the storage node, a first data modification rate at which first storage segments are being modified on the storage node; and send the first data modification rate to a cluster manager.

Example 9 is a method including receiving, by a mirror process from a cluster manager, a storage node identifier that identifies a storage node; obtaining, from the storage node, a plurality of storage segments that have been modified; and sending, to a mirrored cluster of storage nodes, the plurality of storage segments.

Example 10 is the method of example 9 wherein the method further includes receiving, from the cluster manager, a list of the storage segments that have been modified.

Example 11 is the method of example 9 wherein the method further includes sending, by the mirror process to the storage node, a request for a list of storage segments that have been modified; and receiving the list of storage segments that have been modified from the storage node.

Example 12 is the method of example 9 wherein the method further includes receiving, from the cluster manager, authentication credentials; and sending, to the storage node, the authentication credentials.

Example 13 is the method of example 9 wherein the method further includes receiving, from the cluster manager, an address of the mirrored cluster of storage nodes.

Example 14 is the method of example 13 wherein the method further includes receiving, from the cluster manager, an address of a second mirrored cluster of storage nodes; and sending, to the second mirrored cluster of storage nodes, the plurality of storage segments.

Example 15 is the method of example 9 wherein the method further includes determining, by the mirror process, a data mirror rate that identifies a real-time rate at which the mirror process is sending the plurality of storage segments to the mirrored cluster of storage nodes; and sending the data mirror rate to the cluster manager.

Example 16 is the method of example 9 wherein the method further includes periodically: determining, by the mirror process, a data mirror rate that identifies a real-time rate at which the mirror process is sending the plurality of storage segments to the mirrored cluster of storage nodes; and sending the data mirror rate to the cluster manager.

Example 17 is an apparatus that includes a memory and a processor device coupled to the memory. The processor device is to receive, by a mirror process from a cluster manager, a storage node identifier that identifies a storage node; obtain, from the storage node, a plurality of storage segments that have been modified; and send, to a mirrored cluster of storage nodes, the plurality of storage segments.

Example 18 is an apparatus that includes a means for determining that storage segments have been modified on a first storage node of a plurality of storage nodes in a first cluster of storage nodes at a first storage segment modification rate; a means for initiating, in response to determining that the storage segments have been modified on the first storage node at the first storage segment modification rate, a first mirror process that is configured to copy storage segments from an identified storage node to a mirrored cluster of storage nodes; and a means for communicating, to the first mirror process, a storage node identifier that identifies the first storage node.

Example 19 is an apparatus that includes a storage segment modification determiner that is configured to determine that a storage segment has been modified; a mirror process initiator that is configured to initiate a mirror process upon request; and a storage node identifier communicator that is configured to communicate a storage node identifier to the mirror process.

Individuals will recognize improvements and modifications to the preferred examples of the disclosure. All such improvements and modifications are considered within the scope of the concepts disclosed herein and the claims that follow.

What is claimed is:

1. A method comprising:
   determining, by a compute instance comprising a processor device, that storage segments have been modified on a first storage node of a plurality of storage nodes in a first cluster of storage nodes at a first data modification rate, each of the plurality of storage nodes comprising an electronic device, the first data modification rate being the number of storage segments or bytes modified over a determined time interval;
   in response to determining that the storage segments have been modified on the first storage node at the first data modification rate, initiating a first mirror process that is configured to copy storage segments from an identified storage node to a mirrored cluster of storage nodes;
   communicating, to the first mirror process, a storage node identifier that identifies the first storage node;
   receiving, from the first mirror process, information that identifies a first data mirror rate of the first mirror process;
   determining that the first data mirror rate of the first mirror process is lower than the first data modification rate; and
   initiating a second mirror process that is configured to copy storage segments from the identified storage node to the mirrored cluster of storage nodes, wherein a combined data rate of a second mirror data rate of the second mirror process and the first data mirror rate of the first mirror process is at least as high as the first data modification rate.

2. The method of claim 1 wherein determining that the storage segments have been modified on the first storage node at the first data modification rate comprises:
   receiving, from the first storage node, information that identifies the first data modification rate.

3. The method of claim 1 further comprising:
   determining, by the compute instance, that storage segments have been modified on a second storage node of the plurality of storage nodes in the first cluster of storage nodes at a second data modification rate;

in response to determining that the storage segments have been modified on the second storage node at the second data modification rate, initiating at least two additional mirror processes, each mirror process of the two additional mirror processes being configured to copy storage segments from an identified storage node to a mirrored cluster of storage nodes; and communicating to each of the at least two additional mirror processes a storage node identifier that identifies the second storage node.

4. The method of claim 3 further comprising:
communicating to a third mirror process of the at least two additional mirror processes a first list of storage segments on the second storage node to be copied to the mirrored cluster of storage nodes by the third mirror process of the at least two additional mirror processes; and communicating to a fourth mirror process of the at least two additional mirror processes a second list of storage segments on the second storage node to be copied to the mirrored cluster of storage nodes by the fourth mirror process of the at least two additional mirror processes, the second list being different from the first list.

5. The method of claim 4 further comprising:
receiving, by the compute instance from the second storage node, an aggregate list that identifies a plurality of storage segments on the second storage node that are to be copied to the mirrored cluster of storage nodes;

selecting a first subset of storage segments identified on the aggregate list and populating the first list with the first subset of storage segments; and selecting a second subset of storage segments identified on the aggregate list and populating the second list with the second subset of storage segments.

6. The method of claim 1 further comprising:
communicating to the second mirror process the storage node identifier that identifies the first storage node.

7. The method of claim 1 further comprising:
communicating to the first mirror process a first list of storage segments on the first storage node to be copied to the mirrored cluster of storage nodes by the first mirror process; and communicating to the second mirror process a second list of storage segments on the first storage node to be copied to the mirrored cluster of storage nodes by the second mirror process, the second list being different from the first list.

8. The method of claim 1 wherein initiating the second mirror process that is configured to copy storage segments from the identified storage node to the mirrored cluster of storage nodes further comprises:
accessing information that identifies a guaranteed data mirror rate;

determining, based on the information that identifies the first data mirror rate, that the guaranteed data mirror rate is greater than the first data mirror rate; and in response to determining that the guaranteed data mirror rate is greater than the first data mirror rate, initiating the second mirror process.

9. The method of claim 1 further comprising:
terminating, by the compute instance, one of the first mirror process and the second mirror process.

10. The method of claim 9 wherein terminating the one of the first mirror process and the second mirror process comprises:

determining, by the compute instance, that a lesser number of mirror processes can implement a desired data mirror rate; and in response to determining that the lesser number of mirror processes can implement a desired data mirror rate, terminating the one of the first mirror process and the second mirror process.

11. The method of claim 1 further comprising:
communicating, to the first mirror process, an address of a first mirrored cluster of storage nodes.

12. The method of claim 1 further comprising:
communicating, to the first mirror process, an address of a first mirrored cluster of storage nodes to which modified storage segments are to be copied and an address of a second mirrored cluster of storage nodes to which the modified storage segments are to be copied.

13. The method of claim 1 further comprising:
communicating authentication credentials to the first mirror process that are required by the first storage node to gain access to storage segments stored on the first storage node.

14. The method of claim 1 wherein the storage segments modified on the first storage node at the first data modification rate are associated with a first division of an enterprise, and further comprising:
determining, by the compute instance, that storage segments associated with a second division of the enterprise have been modified on the first storage node at a second data modification rate;

communicating, to the first mirror process, first division authentication credentials that are required by the first storage node to gain access to storage segments that are associated with the first division; and communicating to the second mirror process the storage node identifier that identifies the first storage node and second division authentication credentials that are required by the first storage node to gain access to storage segments that are associated with the second division, the second division authentication credentials being different from the first division authentication credentials.

15. The method of claim 14 further comprising:
determining that the second division of the enterprise has a greater priority than the first division;

initiating a plurality of mirror processes, including the second mirror process; and communicating, to each mirror process of the plurality of mirror processes, the storage node identifier that identifies the first storage node and the second division authentication credentials that are required by the first storage node to gain access to storage segments that are associated with the second division.

16. The method of claim 1 wherein the storage segments modified on the first storage node at the first data modification rate are associated with a first enterprise, and further comprising:
determining, by the compute instance, that storage segments associated with a second enterprise have been modified on the first storage node at a second data modification rate;

communicating first enterprise authentication credentials to the first mirror process that are required by the first storage node to gain access to storage segments that correspond to the first enterprise; and communicating, to the second mirror process, the storage node identifier that identifies the first storage node, and second enterprise authentication credentials that are required by the first storage node to gain access to storage segments that are associated with the second enterprise.

17. The method of claim 16 further comprising:
determining that the second enterprise has a greater priority than the first enterprise;
initiating a plurality of mirror processes, including the second mirror process; and
communicating, to each mirror process of the plurality of mirror processes, the storage node identifier that identifies the first storage node, and the second enterprise authentication credentials that are required by the first storage node to gain access to the storage segments that correspond to the second enterprise.

18. The method of claim 17 wherein determining that the second enterprise has the greater priority than the first enterprise comprises:
accessing first information that identifies a first guaranteed data mirror rate associated with the first enterprise;
accessing second information that identifies a second guaranteed data mirror rate associated with the second enterprise; and
determining that the second guaranteed data mirror rate is greater than the first guaranteed data mirror rate.

19. A compute instance, comprising:
a memory; and
a processor device coupled to the memory to:
determine that storage segments have been modified on a first storage node of a plurality of storage nodes in a first cluster of storage nodes at a first data modification rate, each of the plurality of storage nodes comprising an electronic device, the first data modification rate being the number of storage segments or bytes modified over a determined time interval;
in response to determining that the storage segments have been modified on the first storage node at the first data modification rate, initiate a first mirror process that is configured to copy storage segments from an identified storage node to a mirrored cluster of storage nodes;
communicate, to the first mirror process, a storage node identifier that identifies the first storage node;
receive, from the first mirror process, information that identifies a first data mirror rate of the first mirror process;
determine that the first data mirror rate of the first mirror process is lower than the first data modification rate; and
initiate a second mirror process that is configured to copy storage segments from the identified storage node to the mirrored cluster of storage nodes, wherein a combined data rate of a second mirror data rate of the second mirror process and the first data mirror rate of the first mirror process is at least as high as the first data modification rate.

20. A computer program product stored on a non-transitory computer-readable storage medium and including instructions to cause a processor device to:
determine that storage segments have been modified on a first storage node of a plurality of storage nodes in a first cluster of storage nodes at a first data modification rate, each of the plurality of storage nodes comprising an electronic device, the first data modification rate being the number of storage segments or bytes modified over a determined time interval;
in response to determining that the storage segments have been modified on the first storage node at the first data modification rate, initiate a first mirror process that is configured to copy storage segments from an identified storage node to a mirrored cluster of storage nodes;
communicate, to the first mirror process, a storage node identifier that identifies the first storage node;
receive, from the first mirror process, information that identifies a first data mirror rate of the first mirror process;
determine that the first data mirror rate of the first mirror process is lower than the first data modification rate; and
initiate a second mirror process that is configured to copy storage segments from the identified storage node to the mirrored cluster of storage nodes, wherein a combined data rate of a second mirror data rate of the second mirror process and the first data mirror rate of the first mirror process is at least as high as the first data modification rate.

* * * * *